(12) United States Patent
Harris

(10) Patent No.: US 6,464,109 B1
(45) Date of Patent: Oct. 15, 2002

(54) CAULKING GUN AND SUPPORT

(76) Inventor: Randy Harris, 31761 Lake Meadow Dr., Acton, CA (US) 93510

( * ) Notice: Subject to any disclaimer, the term of this patent is extended or adjusted under 35 U.S.C. 154(b) by 0 days.

(21) Appl. No.: 09/826,657

(22) Filed: Apr. 5, 2001

(51) Int. Cl.$^7$ .............................................. B67D 5/64
(52) U.S. Cl. ...................................... 222/160; 222/327
(58) Field of Search ................................ 222/327, 391, 222/160; 401/193

(56) References Cited

U.S. PATENT DOCUMENTS

| | | | | |
|---|---|---|---|---|
| 2,331,549 A | * | 10/1943 | Glawon | 222/391 |
| 2,634,692 A | * | 4/1953 | Sherbondy | 222/391 |
| 4,273,270 A | * | 6/1981 | Kray | 222/327 |
| 4,456,450 A | * | 6/1984 | Heling | 222/391 |

* cited by examiner

Primary Examiner—Philippe Derakshani
(74) Attorney, Agent, or Firm—Colin P. Abrahams

(57) ABSTRACT

A caulking gun and support device comprises a base member for providing stability to the device and for mounting over a surface. A supporting arm extends upwardly from the base member. A caulking gun for receiving a receptacle containing caulking material is mounted on the supporting arm. An adjustment mechanism for selectively positioning and securing the caulking gun is also provided.

17 Claims, 1 Drawing Sheet

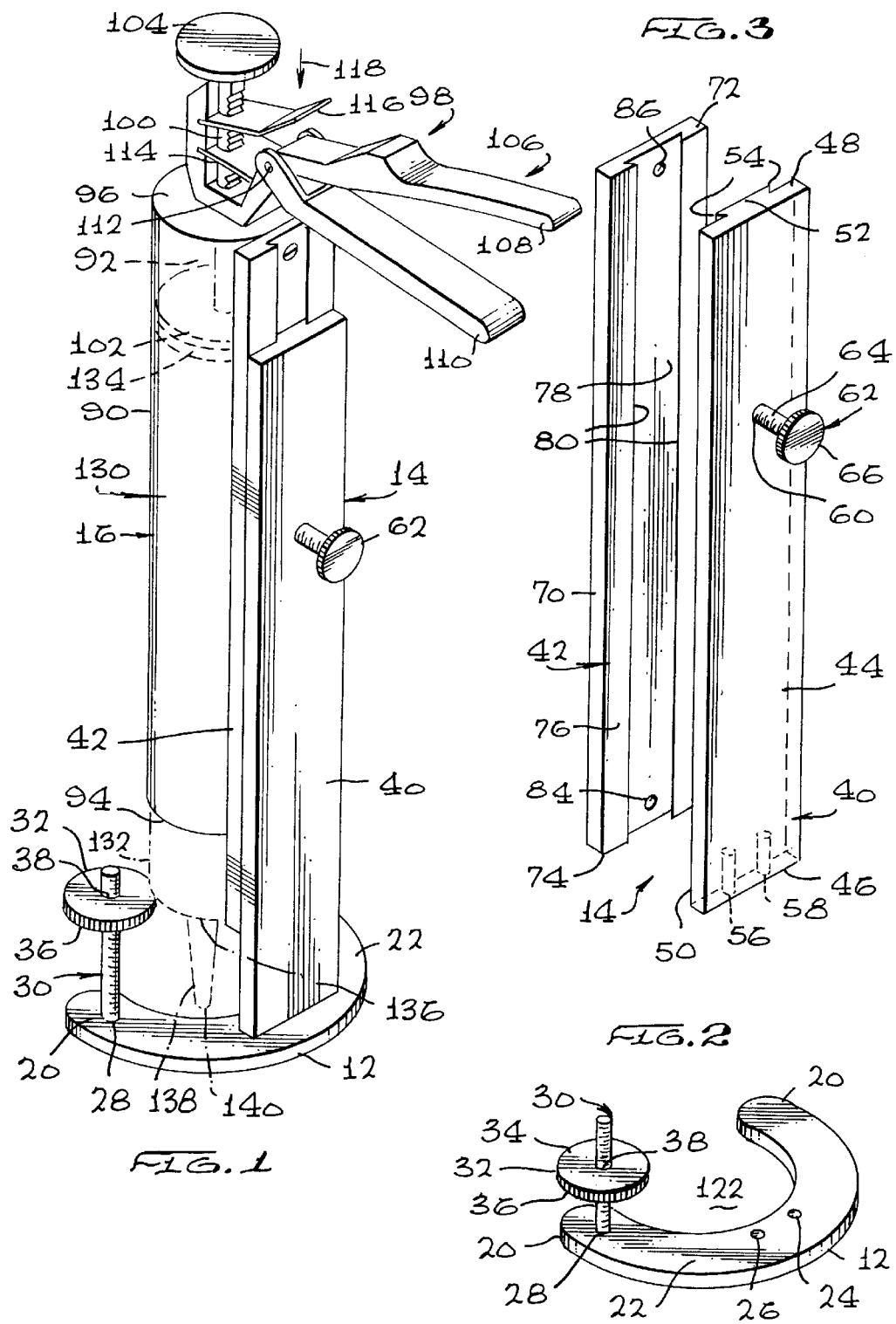

CAULKING GUN AND SUPPORT

BACKGROUND AND FIELD OF THE INVENTION

This invention relates to caulking guns and supports therefor. The invention also relates to supports for receptacles containing material to be dispensed. Particularly, the invention is, in one aspect, for a structure incorporating a caulking gun, the structure providing a stable support over a surface or point at which glue or other material from the caulking gun or other type of receptacle is to be applied. One object of the invention is to provide an adjustable support and stable environment for the use of caulking or other fluid whereby the caulking or other fluid can be accurately, consistently and easily introduced to an area or point without overflow caused by excess material and/or damaging surrounding areas.

While the caulking gun and support of the invention has many applications, one such application comprises use in the field of commercial, industrial and residential flooring. Such flooring may comprise hardwood flooring, tiles, marble or other media, all of which require the use of caulking or fill material in order to fill spaces or gaps between the floor and the medium, or between various pieces of the medium itself, such as tiling. Additionally, caulking may be required at edges between the medium and the wall, door jam or other building structure.

It will be appreciated by those who have used caulking guns or other devices for applying material to a point that it is often difficult to accurately locate the caulking gun for precision use. Typically, a conventional caulking gun comprises a chamber area in which is received a disposable caulking container, the caulking container being essentially cylindrical in shape and having a tapering needle-like point through which the contents of the container pass.

The caulking container fits within the space or chamber of the caulking gun, and the container has a movable base which, upon the application of force thereto, slides up the cylindrical tube forcing caulking fluid out of a small aperture at the end of the needle-like spout at an opposite end thereof. Typical caulking guns have handles or triggers whereby, upon the application of the force, a cylindrical disc attached to a rod moves through the chamber, the disc applying pressure to the lower end of the container to force the contents thereof out through the spout. The disc is movable in a direction which urges the fluid out in an incremental fashion by finely applying force to the trigger or handle which moves the disc. However, even with such fine adjustment possible, very careful and controlled application of force is required, and the application of such force, together with the precise locating of the needle over the area or point to be caulked requires considerable coordination and an experienced user to avoid the expulsion of excess caulking fluid from the container and generally fouling the area around which the caulking glue it required.

SUMMARY OF THE INVENTION

In one aspect, the invention provides a caulking gun and support combination, whereby a container of caulking material can be firmly and stably supported, so that it can be properly positioned for the accurate application of caulking materials to the desired area. It will be appreciated that the invention is not limited to a caulking gun. Any device which expels material to be applied through a receptacle may potentially be used with the invention. Therefore, although this description focuses more on the use of a caulking gun, the invention is not limited to this embodiment.

Preferably, the caulking gun and support of the invention typically receives a caulking container which comprises an elongate cylindrical housing. At one end of the cylindrical housing, there is provided a tapering outlet or spout, and a small aperture or hole can be made at the end of the spout when opening the container and through which the caulking material can be expelled.

At the opposite end of the caulking container there is provided a base closure which seals the caulking material within the container. The base closure is slidable up the cylindrical container, from a base end thereof towards the spout, so that the movement thereof in the container places the contents under pressure, at the same time expelling the contents through the aperture in the outlet.

A typical caulking gun accommodates the container, and provides means by which the base closure can be forced upwardly through the cylinder for expelling the caulking material.

According to one aspect of the invention, there is provided a caulking gun and support device comprising: a base member for providing stability to the device and for mounting over a surface; a supporting arm extending upwardly from the base member; a caulking gun for receiving a receptacle containing caulking material, the caulking gun being mounted on the supporting arm; and adjustment means for selectively positioning and securing the caulking gun.

Preferably, the supporting arm comprises a fixed arm connected to the base member, and a slidable arm connected to the fixed arm, the slidable arm being moveable relative to the fixed arm to adjust the position of the caulking gun. The fixed arm may comprise an elongate projection along a surface thereof, and the slidable arm may comprise an elongate channel along the length thereof, the elongate projection sliding within the elongate channel to provide relative movement between the fixed arm and slidable arm respectively. Securing means for releasably securing the fixed arm and slidable arm relative to each other may be provided.

Preferably, the adjustment means comprises a stop member, adjustably positioned with respect to the base member. The stop member may comprise a threaded rod extending from the base and a stop means mounted on the threaded member, the stop means having a threaded bore for receiving the threaded member whereby rotation thereof causes it to move along the threaded member to a selected position.

According to another aspect of the invention, there is provided a support device for a receptacle containing material to be dispensed, the support device comprising a base member for providing stability to the device and for mounting over a surface; a supporting arm extending upwardly from the base member; a module on the supporting arm for receiving the receptacle containing material to be dispensed; and adjustment means for selectively positioning and securing the module.

BRIEF DESCRIPTION OF THE DRAWINGS

FIG. 1 is a perspective view of a caulking gun and support of the invention;

FIG. 2 is a perspective view of the base of the caulking gun and support therefor of the invention; and FIG. 3 is a perspective view of the vertical support members of the caulking gun and support of the invention.

DETAILED DESCRIPTION OF THE DRAWINGS

The invention is for a caulking gun with support, and provides a procedure whereby a caulking container can be affixed thereto and accurately located over an area to which caulking glue can be applied. Further, the caulking gun and support provides a stable base for support and balancing of the caulking container, and assists the user in providing a consistent supply of glue, as necessary, to a particular point.

With reference to FIG. 1 of the drawings, there is shown a caulking gun and support 10, comprising a base 12, supporting arms 14, and caulk gun 16. The base 12 is designed so as to be of a shape and size which provides the support, balance and stability to the caulking gun and support 10 as a whole, and in the embodiment shown in FIG. 1, comprises a partially circular or horseshoe-shaped member. The base 12 comprises ends 20, and middle section 22. The middle section 22, as best shown in FIG. 2 of the drawings, comprises a pair of spaced holes 24 and 26 drilled through the base, by means of which the supporting arms 14 are attached to the base 12, as will be described further below.

Near one end 20 of the base 12, there is provided a threaded hole 28, which may extend completely through the base 12, or only partially therethrough, and in which is threadedly engaged a zinc anodized threaded rod 30, which, in use, is substantially vertical, or normal to the surface on which the base 12 rests. A disc or washer 32 is mounted on the rod 30, the disc 32 having an upper surface 34, a lower surface 36, and a substantially centrally located hole 38. The hole 38, which is threaded, threadedly engages the rod 30, so that by rotation of the disc or washer 32 it is moved up or down the rod 30 to the desired point, as will also be described below. In its mounted position, the washer or disc 32 will be substantially parallel with the surface on which the base 12 is mounted. The position of the disc or washer 32 on the rod 30 is adjustable so as to form a support for a caulking container or for the caulk gun 16, as will be described further below.

The supporting arms 14 is shown in FIG. 1 in relation to the caulking gun and support 10 as a whole, and are also shown in FIG. 3 of the drawings in greater detail. These supporting arms 14 comprise a fixed arm 40 and a slidable arm 42 which slidably engages with the fixed arm 40. The fixed arm 40 is firmly connected to the base 12. The fixed arm 40 comprises a flat surface 44, a lower end 46, an upper end 48, and an engaging surface 50. The engaging surface 50 has a male component 52 extending or projecting outwardly therefrom, the male component 52 having opposing tapers 54.

Drilled into the lower end 46 are two threaded bores 56 and 58, the threaded bores 56 and 58 being mounted over the holes 26 and 24 respectively which are drilled into the base 12. The fixed arm 40 is securely fastened to the base 12 by inserting screws (not shown) through holes 24 and 26 from the undersurface of the base, so that they pass through the holes 24 and 26 into the threaded bores 58 and 56. The screws are tightly fastened until the fixed arm 40 is firmly secured to the base 12 and will not move relative thereto.

A threaded hole 60 is drilled into the fixed arm 40 in the upper half thereof, and a knob 62 having a threaded shank 64 and a handle 66 is screwed into the threaded hole 60 so that the threaded shank 64 can pass right through the threaded hole, which goes through the entire width of the fixed arm 40. As will be described below, by turning the handle 66 of the knob 62 clockwise, the threaded shank 64 extends through the threaded hole 60 in order to engage the slidable arm 42, so that the slidable arm can be placed in a fixed position relative to the fixed arm 40, in a desired fashion.

The slidable arm 42 comprises a flat surface 70, an upper end 72, a lower end 74, and an engaging surface 76. The engaging surface 76 comprises a channel 78 having tapers 80. It will be appreciated that the slidable arm 42 engages with the fixed arm 40 by placing the lower end 74 of the slidable arm 42 near the upper end 48 of the fixed arm 40, and carefully inserting the male component 52 in the channel 78. When so inserted, the tapers 54 on the male component 52 will fit within the tapers 80 of the channel 78. This type of engagement, well known in many fields of art, will permit the slidable arm 42 to move vertically up and down with respect to the fixed arm 40, but there will be no movement in a horizontal direction. This arrangement, therefore, allows for the slidable arm 42 to be moved vertically to the desired position, as will be described below, relative to the fixed arm 40.

Once the slidable arm 42 is in such a selected position, the handle 66 is rotated clockwise, thereby causing the threaded shank 64 to extend through the threaded hole 60, and engage the engaging surface 76 of the slidable arm 42. Further rotation of the handle 66 causes the slidable arm 42 and fixed arm 40 to be forced away from each other, causing frictional engagement between the tapers 54 of the male component 52 and the tapers 80 of the channel 78. When the knob 62 has been sufficiently tightly turned, no further vertical movement between the fixed arm 40 and the slidable arm 42 will be permitted under normal circumstances, until the knob 62 is loosened by turning it counter-clockwise, and freeing up the slidable arm 42 for relative movement adjacent the fixed arm 40.

The slidable arm 42 comprises a pair of apertures 84 and 86 near the lower end 74 and upper end 72 respectively. The apertures 84 and 86 accommodate screws, bolts or other fastening devices, by means of which a caulk gun 16 can be connected to the slidable arm 42. As will be seen with reference to FIG. 1 of the drawings, the caulk gun 16 is firmly attached to the slidable arm 42, and in the embodiment shown in FIG. 1, is substantially coextensive with the slidable arm 42, so as to be more or less the same length thereof.

The caulk gun 16, attached to the slidable arm 42, comprises a cylindrical housing 90 defining a chamber 92 including an opening (not shown) along the length thereof so that the caulking container can be located therein, as will be described. The cylindrical housing 90 has an open lower end 94, and a closed or partially closed upper end 96 upon which is mounted a handle and trigger mechanism 98. The handle and trigger mechanism 98 is of conventional design, and will only be described briefly herein below. In another embodiment, the lower end 94 may be partially closed to keep the caulking container from falling out of the chamber 92, and a support in the form of a washer or ring at the lower end 94 may be provided as a collar upon which the caulking container rests.

The handle and trigger mechanism 98 comprises an elongate shaft 100 which is extends through an aperture in the closed upper end 96 of the cylindrical housing 90. At its end within the chamber 92, the shaft 100 terminates in a disc-shaped pusher 102, while at its outer end, the shaft 100 has a knob 104. A handle mechanism 106 is provided, and comprises a fixed member 108 and a pivotal lever 110, which rotates about pivot pin 112. When pivotal lever 100 of the handle mechanism 106 is pulled by the user towards the fixed member 108, an engagement member 114 is urged downwardly, and, at the same time, moves the shaft 100 downwardly in a vertical position. As the shaft 100 moves downwardly, the pusher 102 also moves downwardly within the chamber 92, engaging the caulking container, to be described.

The shaft 100 will not be able to move upward again, and is held in position by a release lever 116. When it is desired to release the shaft 100 and pull it outwardly, out of the chamber 92, the release lever 116 is pushed down in the direction of arrow 118, to permit this operation.

It will therefore be appreciated that, in conventional fashion, the raising and lowering of the handle 106, either incrementally, or by large through-movements, has the effect of causing the pusher 102 to move downwardly though the chamber 92.

In operation, the caulking gun and support 10 of the invention is located so that the base 12 thereof is proximate the area or point where caulking glue is to be introduced. The horseshoe-shaped base 12 defines an area 122 therein containing the point at which the caulking glue is to be introduced. At this juncture, a caulk container 130 is already accommodated within the chamber 92, or, if not, is now placed in the chamber 92. As mentioned, the cylindrical housing 90 includes an opening, not shown, through which the caulk container 130, also of substantially cylindrical shape, but of slightly smaller dimensions than the chamber 92, can be introduced. In locating the caulk container 130 within the chamber 92, the shaft 100 is adjusted so that the pusher 102 is near the closed upper end 96, and this is achieved by holding down the release lever 116 and pulling outwardly on the knob 104.

The caulking container 130, located within the chamber 92, extends through the open lower end 94 of the chamber 92. The caulking container 130 comprises cylindrical side walls 132, a base closure 134, an annular neck portion 136, and a tapering spout 138. The annular neck portion 136 extends, in one embodiment, through the open lower end 94, and is allowed to rest on the upper surface 34 of the disc or washer 32. The spout 138 has an outlet port 140 which is located just over the area where caulking glue is required, and the entire caulking container 130 is positioned so that the outlet port 140 is just above this area or point. This is achieved by raising or lowering the caulking container 130 within the chamber 92, by rotating the disc or washer 32 up and down on the rod 30. With the annular neck portion 136 resting on the upper surface 34, the position of the washer or disc 32 can be appropriately selected by turning it so as to move up and down the rod 30 until the outlet port 140 of the caulking container 130 is exactly where required. In another embodiment, it is the lower end 94 of the caulk gun 16 that rests on the disc or washer 32. In this case, the caulk container 130 is fully accommodated in the chamber 92. In either embodiment, the adjustment of the position of the disc 32 facilitates the accurate location of the outlet port 140 to assist the user.

Precise locating of the caulk container 130 relative to the portion where caulking glue is required can also be achieved by moving the slidable arm 42 up and down vertically with respect to the fixed arm 40, and securing the slidable arm 42 relative to the fixed arm 40 in precisely the desired position by tightening the knob 62 so that the slidable arm 42 and fixed arm 40 will not move relative to each other, as has already been described.

It will thus be appreciated that the caulking gun and support 10 of the invention provides two independent adjustment operations for optimal placement of a caulking container 130, and more particularly the outlet port 140 thereof, to be stably and firmly located over an area or point at which caulking glue is to be introduced.

With the base 12 appropriately located, and the position of the caulking container 130 adjusted for optimal placement in the chamber 92, by adjustment of the fixed arm 40 and slidable arm 42 as well as the position of the disc or washer 32, the caulking gun and support of the invention 10 is now ready for use. The outlet port 140 is located just over a hole, for example in a wooden floor, or over a tile, or some other area to be filled, and the pivotal lever 110 of the handle mechanism 106 is slowly raised by the operator. Raising the pivotal lever 110 causes downward movement of the shaft 100, so that the pusher 102 exerts pressure on the base closure 134 of the caulk container 130. The base closure 134 of the caulk container 130 is forced into the caulk container 130, in conventional fashion, causing pressure on the contents thereof, so that caulking glue is expelled through the outlet port 140.

The caulking gun and support 10 of the invention allows the user to very carefully and selectively place the outlet port 140 of the caulking container 130 and maintain the whole mechanism in a balanced, stable and fixed position, so that very careful operation of the handle mechanism 106 can be achieved. Therefore, the caulking gun and support 10 of the invention allows for measured and consistent quantities of glue to be expelled through the outlet port 140 by fine manipulation of the handle mechanism 106, allowing for more accurate workmanship, and a cleaner application of the caulking glue.

In a variation of the invention briefly described above, where the caulking container 130 fits entirely within the chamber 92, it will be the lower end 94 of the cylindrical housing 90 that rests upon the upper surface 34 of the washer or disc 32. Thus, the invention accommodates the position when the caulking container 130 fits completely within the chamber 92, as well as that condition where it is larger than the chamber 92 in length, so that a variety of sizes of caulking containers, as well as caulking gun and supports 10 of the invention, will be workable.

In one embodiment of the invention, the caulking gun will hold two tubes of glue, and an injection needle attached at the bottom.

Preferably, the slidable arm 42 and fixed arm 40 are made of polished aluminum, thereby permitting easy washing and cleaning thereof, and preventing corrosion which may result from exposure to water or air. Further, the disc or washer 32 is also preferably comprised of aluminum, while the rod 30 is made of zinc anodized material. The support of the invention may also be anodized, either completely or partially.

The base 12, providing the balance and stability for the entire caulking gun and support 10 of the invention, is also preferably comprised of polished aluminum.

In another embodiment of the invention, the caulking gun and support may include an injection needle through which material dispensed is conveyed from the receptacle to the point or area to which the material is to be applied. The injection needle may be appropriately located so as to receive the spout 138 and outlet port 140 of a receptacle, or the injection needle may replace, at least in part, the spout 138 and/or outlet port 140. The injection needle may include a control and/or shut-off valve, such as a ball or check valve, to control and monitor the flow or amount of material being dispensed.

The invention is not limited to the precise details described herein. For example, it is not essential that the fixed arm 40 and slidable arm 42 be movable relative to each other if sufficient scope for adjustment is provided by movement of the washer 32 on the rod 30. Further, where the slidable arm 42 does slide with respect to the fixed arm 40, other mechanisms for tightening the slidable arm 42 and fixed arm 40 relative to each other, aside from the knob 62 as shown in the drawings, may be provided. Any manner whereby the two arms may be selectively tightened and loosened with respect to each other would be appropriate.

While the invention has generally been described with reference to its use with caulking guns, it must be appreciated that the invention is not to be construed as being limited to that application. The invention may be used with any corresponding container or receptacle where the materials therein are to be dispensed in a controlled and/or consistent manner, and/or at a desired point or area.

I claim:

1. A caulking gun and support device comprising:
   a base member for providing stability to the device and for mounting over a surface;
   a supporting arm extending upwardly from the base member;
   a caulking gun for receiving a receptacle containing caulking material, the caulking gun being mounted on the supporting arm; and
   adjustment means for selectively positioning and securing the caulking gun, wherein the adjustment means comprises a stop member, adjustably positioned with respect to the base member.

2. A device as claimed in claim 1 wherein the base member comprises a horseshoe-shaped member.

3. A device as claimed in claim 2 wherein the base member is at least partially circular in shape.

4. A device as claimed in claim 1 further comprising connecting means whereby the supporting arms are firmly connected to the base member.

5. A device as claimed in claim 4 wherein the connecting means comprises a threaded member extending through the base and into the supporting arm.

6. A device as claimed in claim 1 wherein the supporting arm comprises a fixed arm connected to the base member, and a slidable arm connected to the fixed arm, the slidable arm being moveable relative to the fixed arm to adjust the position of the caulking gun.

7. A device as claimed in claim 6 wherein the fixed arm comprises an elongate projection along a surface thereof, and the slidable arm comprises an elongate channel along the length thereof, the elongate projection sliding within the elongate channel to provide relative movement between the fixed arm and slidable arm respectively.

8. A device as claimed in claim 7 further comprising securing means for releasably securing the fixed arm and slidable arm relative to each other.

9. A device as claimed in claim 8 wherein the securing means comprises a knob having a handle and a threaded shank, the threaded shank passing through the fixed arm through a threaded aperture therein, whereby rotation of the knob causes the shank to engage or disengage the slidable arm respectively to provide a releasable connection between the fixed arm and the slidable arm.

10. A device as claimed in claim 7 wherein the caulking gun is mounted on the slidable arm.

11. A device as claimed in claim 1 wherein the stop member comprises a threaded rod extending from the base and a stop means mounted on the threaded member, the stop means having a threaded bore for receiving the threaded member whereby rotation thereof causes it to move along the threaded member to a selected position.

12. A device as claimed in claim 11 wherein the stop means comprises a polished aluminum disc mounted on the threaded member.

13. A device as claimed in claim 1 wherein the caulking gun comprises a cylindrical housing defining a chamber, and a handle and trigger mechanism associated therewith for engaging the receptacle containing the caulking material.

14. A support device for a receptacle containing material to be dispensed, the support device comprising:
    a base member for providing stability to the device and for mounting over a surface;
    a supporting arm extending upwardly from the base member;
    a module on the supporting arm for receiving the receptacle containing material to be dispensed; and
    adjustment means for selectively positioning and securing the module, wherein the adjustment means comprises a stop member, adjustably positioned with respect to the base member.

15. A device as claimed in claim 14 wherein the supporting arm comprises a fixed arm connected to the base member, and a slidable arm connected to the fixed arm, the slidable arm being moveable relative to the fixed arm to adjust the position of the caulking gun.

16. A device as claimed in claim 14 wherein the stop member comprises a threaded rod extending from the base and a stop means mounted on the threaded member, the stop means having a threaded bore for receiving the threaded member whereby rotation thereof causes it to move along the threaded member to a selected position.

17. A device as claimed in claim 16 wherein the stop means comprises a polished aluminum disc mounted on the threaded member.

\* \* \* \* \*